(12) United States Patent
Chen et al.

(10) Patent No.: US 12,380,268 B2
(45) Date of Patent: Aug. 5, 2025

(54) DOCUMENT CREATION METHOD AND APPARATUS, AND DEVICE AND STORAGE MEDIUM

(71) Applicant: BEIJING ZITIAO NETWORK TECHNOLOGY CO., LTD., Beijing (CN)

(72) Inventors: Wei Chen, Beijing (CN); Guangping Xie, Beijing (CN); Xuejia Chen, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/457,693

(22) Filed: Aug. 29, 2023

(65) Prior Publication Data
US 2023/0401377 A1    Dec. 14, 2023

Related U.S. Application Data

(63) Continuation of application No. PCT/CN2022/078246, filed on Feb. 28, 2022.

(30) Foreign Application Priority Data

Mar. 1, 2021 (CN) .......................... 202110227779.0

(51) Int. Cl.
*G06F 17/00* (2019.01)
*G06F 40/106* (2020.01)
*G06F 40/166* (2020.01)

(52) U.S. Cl.
CPC .......... *G06F 40/166* (2020.01); *G06F 40/106* (2020.01)

(58) Field of Classification Search
CPC .... G06F 40/106; G06F 40/134; G06F 40/169; G06F 40/166; G06F 40/177; G06F 40/197; G06F 40/174; G06F 3/04842; G06F 3/0482
USPC .......................................................... 715/255
See application file for complete search history.

(56) References Cited

U.S. PATENT DOCUMENTS

| 6,154,723 A * | 11/2000 | Cox ..................... G06F 3/04845 |
| | | 715/848 |
| 2004/0163105 A1 * | 8/2004 | Thursfield ............... G06F 3/011 |
| | | 725/135 |

(Continued)

FOREIGN PATENT DOCUMENTS

| CN | 1319817 A | 10/2001 |
| CN | 101278283 A | 10/2008 |

(Continued)

OTHER PUBLICATIONS

International Search Report (with English translation) and Written Opinion issued in PCT/CN2022/078246, dated Apr. 24, 2022, 9 pages provided.

(Continued)

*Primary Examiner* — Jason T Edwards
(74) *Attorney, Agent, or Firm* — Astute IP Law Group

(57) ABSTRACT

A document creation method, and a device and a storage medium are provided. The method comprises: in an editing interface of the current document, calling an operation panel according to a trigger event, and displaying the operation panel; displaying a creation control of a reference object in the operation panel; and in response to an operation of a user for the creation control, creating a new reference object, and establishing a reference relationship between the current document and the reference object.

12 Claims, 6 Drawing Sheets

--- call an operation panel based on a triggering event and display the operation panel, in an editing interface of a current document — S110

Display, on the operation panel, a creation control for creating a reference object — S120

Create a new reference object in response to an operation performed by a user on the creation control; and establish a reference relationship between the current document and the reference object — S130

(56) References Cited

U.S. PATENT DOCUMENTS

| | | | |
|---|---|---|---|
| 2010/0058176 A1 | 3/2010 | Carro et al. | |
| 2014/0149858 A1* | 5/2014 | Vecera | G06F 40/103 |
| | | | 715/273 |
| 2014/0372858 A1* | 12/2014 | Campbell | G06F 40/18 |
| | | | 715/220 |
| 2015/0113448 A1* | 4/2015 | Underwood | G06F 40/143 |
| | | | 715/760 |
| 2017/0220567 A1 | 8/2017 | Masson et al. | |
| 2018/0189256 A1* | 7/2018 | Gonzalez | G06F 40/134 |
| 2021/0044709 A1* | 2/2021 | Hashimoto | G06F 3/04842 |

FOREIGN PATENT DOCUMENTS

| | | |
|---|---|---|
| CN | 108292302 A | 7/2018 |
| CN | 109446503 A | 3/2019 |
| CN | 109684613 A | 4/2019 |
| CN | 110134800 A | 8/2019 |
| CN | 112328853 A | 2/2021 |
| CN | 112380819 A | 2/2021 |
| JP | H11175638 A | 7/1999 |
| JP | 2002259360 A | 9/2002 |
| JP | 2007079747 A | 3/2007 |

OTHER PUBLICATIONS

Office Action issued in Chinese Application No. 202110227779.0, dated Feb. 18, 2024, 17 pages, with English translation.

How to use Word to reference Excel data and keep it updated synchronously—Baidu Experience, https://jingyan.baidu.com/article/fcb5aff7880d4eedaa4a71a3.html, 8 pages, Jul. 2, 2014.

Office Action issued in Japanese Patent Application No. 2023-552583, date May 28, 2024, with machine translation.

* cited by examiner

DOCUMENT CREATION METHOD AND APPARATUS, AND DEVICE AND STORAGE MEDIUM

This application is a continuation application of International Application No. PCT/CN2022/078246, filed on Feb. 28, 2022, which claims priority to Chinese Patent Application No. 202110227779.0, titled "DOCUMENT CREATION METHOD AND APPARATUS, AND DEVICE AND STORAGE MEDIUM", filed on Mar. 1, 2021 with the China National Intellectual Property Administration, both of which are incorporated herein by reference in entireties.

FIELD

The present disclosure relates to the technical field of electronic device and in particular to a method and apparatus for object creation, a device and a storage medium.

BACKGROUND

In the conventional technology, if a user needs to create a new document to record some temporary content when editing a current document, or needs to arrange a part of the content of the current document into a new document, the user often has to leave the current document and perform creation operations on specified creation controls. Then, the relevant content is edited to the new document. Such operations cause inconvenience to the users while editing documents.

SUMMARY

A method and apparatus for document creation, a device and a storage medium are provided according to the embodiments of the present disclosure, which can save operation paths while creating new objects and improve user experience.

In a first aspect, a method for document creation is provided according to the present disclosure. The method includes:
  in an editing interface of a current document, calling an operation panel based on a triggering event and displaying the operation panel;
  displaying, on the operation panel, a creation control for creating a reference object;
  creating, in response to an operation performed by a user on the creation control, a new reference object; and
  establishing a reference relationship between the current document and the reference object.

In a second aspect, an apparatus for document creation is provided according to the present disclosure. The apparatus includes:
  an operation panel calling module, configured to call and display, in an editing interface of a current document, an operation panel based on a triggering event;
  a creation control display module, configured to display, on the operation panel, a creation control for creating a reference object;
  a reference object creation module, configured to create a new reference object, in response to an operation performed by a user on the creation control; and establish a reference relationship between the current document and the reference object.

In a third aspect, an electronic device is provided according to the present disclosure. The electronic device includes:
  one or more processors; and
  a storage configured to store one or more instructions;
  wherein, the one or more instructions, when executed by the one or more processors, cause the one or more processors to implement the method for document creation according to the embodiments of the present disclosure.

In a fourth aspect, a computer readable storage medium is provided according to the present disclosure. The computer readable storage medium storing a computer program thereon, wherein the computer program, when executed by a processor, implements the method for document creation according to the embodiments of the present disclosure.

In a fifth aspect, a computer program product is provided according to the present disclosure. The computer program product includes a computer program carried on a computer readable medium, and the computer program includes program codes for implementing the method for document creation according to the embodiments of the present disclosure.

DETAILED DESCRIPTION OF EMBODIMENTS

Figure 1:
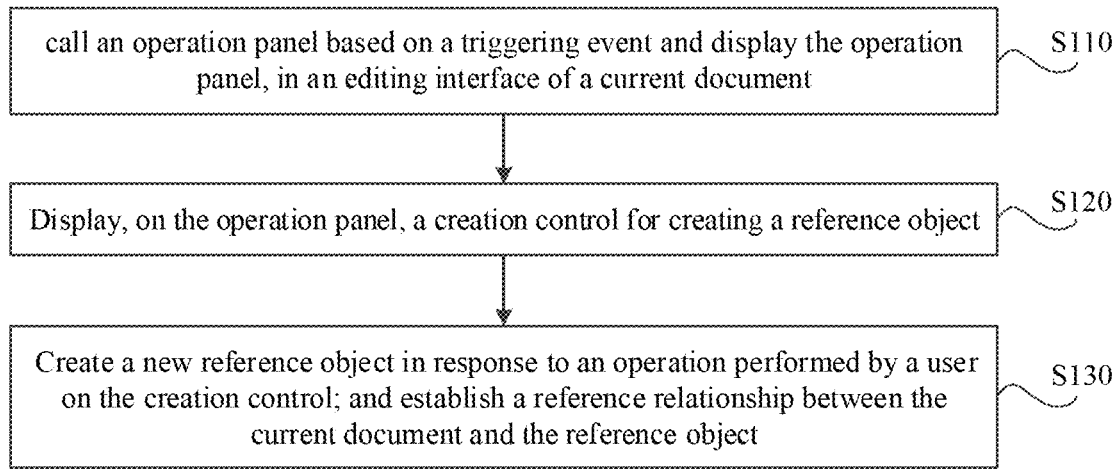
FIG. 1 is a flowchart of a method for document creation according to an embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments described herein. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

FIG. 1 illustrates a flowchart of a method for document creation according to an embodiment of the present disclosure. This embodiment is applicable to the case where a reference object is created when editing a document. The method can be implemented by an apparatus for document creation, which may constitute by hardware and/or software, and can be generally integrated into a device with object creation function. Such device may be an electronic device such as a user terminal. As shown in FIG. 1, the method specifically includes steps S110-S130 as follows.

In S110, in an editing interface of a current document, an operation panel is called based on a triggering event and is displayed.

The current document may be a target document that the user expects to edit; the editing interface may be a display interface that allows the user to edit the current document; the triggering event may be an event for an instruction for evoking an operation panel; and the operation panel may be the tools panel for performing reference operations in the editing interface of the document.

Specifically, the event for the instruction for evoking the operation panel may be triggered by the user, or may be automatically triggered when a certain condition is met. For example, the user can trigger the event for the instruction for evoking the operation panel by inputting a set evoking character, clicking a set button, or inputting a set voice instruction, etc.; or, the terminal can automatically evoke the operation panel when it receives characters related to the object frequently referenced by the user.

In an embodiment, the user can trigger an event for the instruction for evoking the operation panel by inputting a set evoking character. And the terminal may call and display the operation panel based on the instruction for evoking the operation panel.

In this embodiment, in the editing interface of the current document, before calling the operation panel based on the triggering event and displaying the operation panel, in a case that a set evoking character inputted by the user is received, it is determined that a triggering event for evoking is generated.

In a possible implementation, the set evoking character may be a specific character (e.g., "@", "[[", etc.) set in the terminal to evoke the operation panel. In the editing interface of the current document, in a case that the set evoking character inputted by the user is received (e.g., the character "@" is received from the user), it can be determined that a triggering event for evoking is generated, that is, the instruction for evoking the operation panel is triggered. The operator panel may then be called and displayed for further operations.

In a possible implementation, other characters or shortcut keys for evoking the operation panel may be set in the terminal, or a button for evoking the operation panel may be displayed in the document editing interface. For example, the user may also input "/" (slash), click the "+" button at the blank line of the document, or set the shortcut key for evoking the operation panel to evoke the operation panel.

In the editing interface of the current document, by means of calling the operation panel based on the triggering event for evoking and displaying the operation panel, the operation panel can be quickly evoked in the document, which saves operational steps of the user.

In S120, a creation control for creating a reference object is displayed on the operation panel.

The reference object may be a content block or a document in the space where the current document is located, and the creation control may be an encapsulation of data and methods used to create the reference object in the document.

In a possible implementation, the creation control may be displayed independently of the operation panel, or may be embedded on the operation panel.

In a possible implementation, the reference object is a content block, and the content block is a unit for carrying document content; or the reference object is a document.

In a possible implementation, a content block is a module in a document. A piece of text, an image, a code and the like are all different types of content blocks. A document is composed of multiple content blocks. Users may refer to the content block(s) in other documents. In a possible implementation, the user may also use the document as a reference object. When another document is referenced to the current document, the referenced document may be regarded as a content block in the current document.

In a possible implementation, the entire document may be regarded as composed of at least one content block, where content blocks may be rearranged by dragging. Conversions between different types of content blocks may be realized, for example, a text-type content block may be converted into a document-type content block. In addition, modules may be connected to have interactive relationships and further collaborate.

User operation may be further facilitated by displaying the creation control for creating a reference object on the operation panel.

In S130, in response to an operation performed by a user on the creation control, a new reference object is created; and a reference relationship between the current document and the reference object is established.

Where, an operation performed by a user on the creation control may be to click the create button in the creation control; the reference relationship between the current document and the reference object may be the synchronization relationship between the current document and the reference object or source document of the reference object. As an example, if the document B is referenced in A, then document B is the reference object of document A. Correspondingly, the reference relationship between the documents A and B may be expressed as: when document B is updated, the document B referenced in document A is also updated synchronously.

In a possible implementation, establishing the reference relationship between the current document and the reference object may be to establish a connection between the current document and the reference object or source document of the reference object. In a case that the reference object is a content block, the connection between the current document and the source document of the content block is established. In a case that the reference object is a document, the connection between the current document and the referenced document is established.

In this embodiment, when the reference object is a content block, the method for creating a new reference object may include: creating a new document, and creating in the new document a content block corresponding to the reference object.

Specifically, when the reference object is a content block, the user may first create a new document, then create a corresponding content block in the new document, subsequently incorporate the content block into the current document as a reference object.

In a possible implementation, when the reference object is a content block, after creating a new reference object, a new document may be created and the content block may be added to the new document.

Specifically, when the reference object is a content block, after the reference object is created, the user may create a new document and add the content block in the current document to the new document.

In this embodiment, when the reference object is a document, creating a new reference object may include: creating a new document.

In a possible implementation, when the reference object is a document, a new reference object may be created by creating a new document and referencing the new document to the current document.

In a possible implementation, creating a new document may include: acquiring, in the current document, document content information corresponding to the triggering event; and using the document content information as a title or document content of the new document.

In a possible implementation, in a case that a reference object is created by creating a new document, the content corresponding to the triggering event may be used as the title or content of the new document. For example, in a case that the user inputs a text after triggering the operation panel, a new document may be created, where the text inputted by the user may be used as the title or content of the new document.

In a possible implementation, after creating a new document, the method may further include: replacing, in the current document, the document content information corresponding to the triggering event with information of the new document, where the information of the new document includes content information and/or document identification information of the new document.

In a possible implementation, after the new document is created, the content corresponding to the triggering event may be replaced with the information of the new document. For example, in a case that a new document is created after the user triggers the operation panel, the content corresponding to the previously triggered operation panel may be replaced with the identification information of the new document.

In this embodiment, establishing the reference relationship between the current document and the reference object may include: in a case that the reference object is a content block, establishing the relationship for referencing the content block in the current document; in a case that the reference object is a document, establishing the relationship for referencing the created document in the current document.

In a possible implementation, the following schemes may be used for creating a reference object of a document-type in the current document.

Figure 2A:
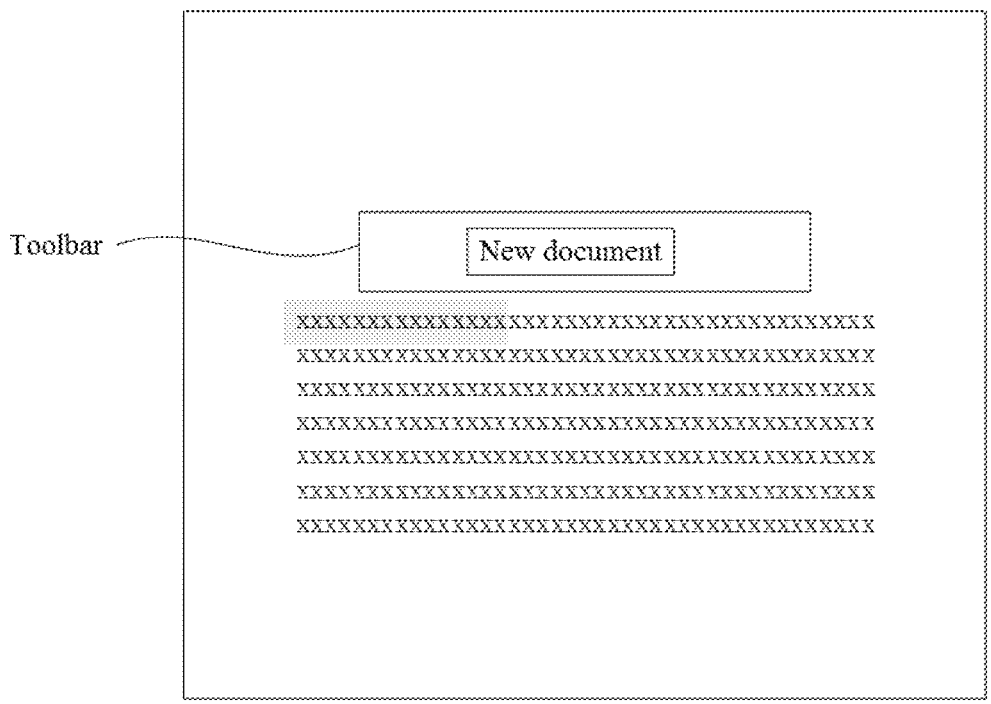
FIG. 2A-2D are schematic diagrams of a document creation process according to an embodiment of the present disclosure.

1. As shown in FIG. 2A, the user selects the text in the current document. A floating toolbar appears after the text is selected. In a case that it is received that the user clicks the "New Document" button in the toolbar, a new document is created in the current document while using the text selected by the user as the title of the newly created document.

Figure 2B:
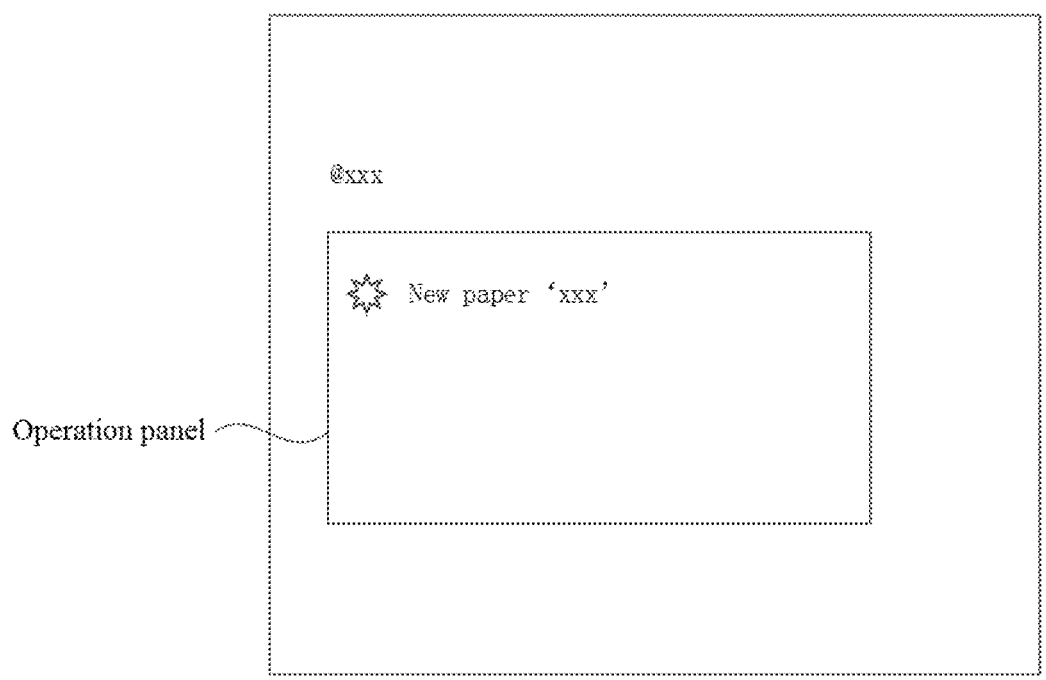

2. As shown in FIG. 2B, once a set character such as "@", "[[", etc. inputted by the user is received, the operation panel is evoked to be displayed on the editing interface of the current document. In addition, the text inputted by the user after the set character text is used as the title of the newly created document. And, in response to the operation performed by the user on the creation control in the operation panel, a new reference object is created.

Figure 2C:
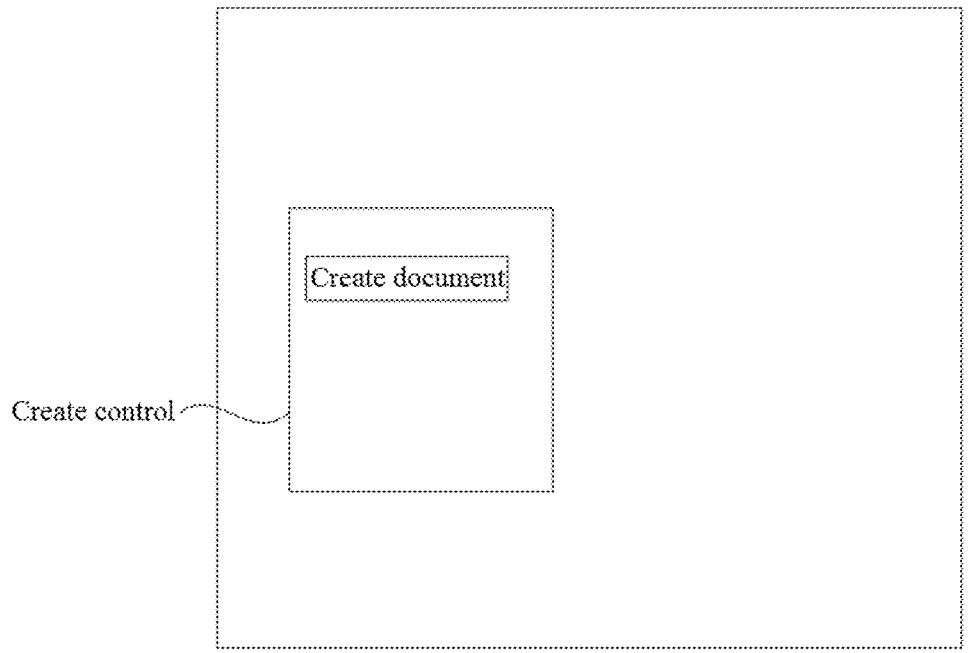

3. As shown in FIG. 2C, the creation control may be evoked by setting a button. For example, the user may evoke the creation control through the "I" (slash) button. And then, by clicking the "New Document" button in the creation control, a document with a void title is created.

Figure 2D:
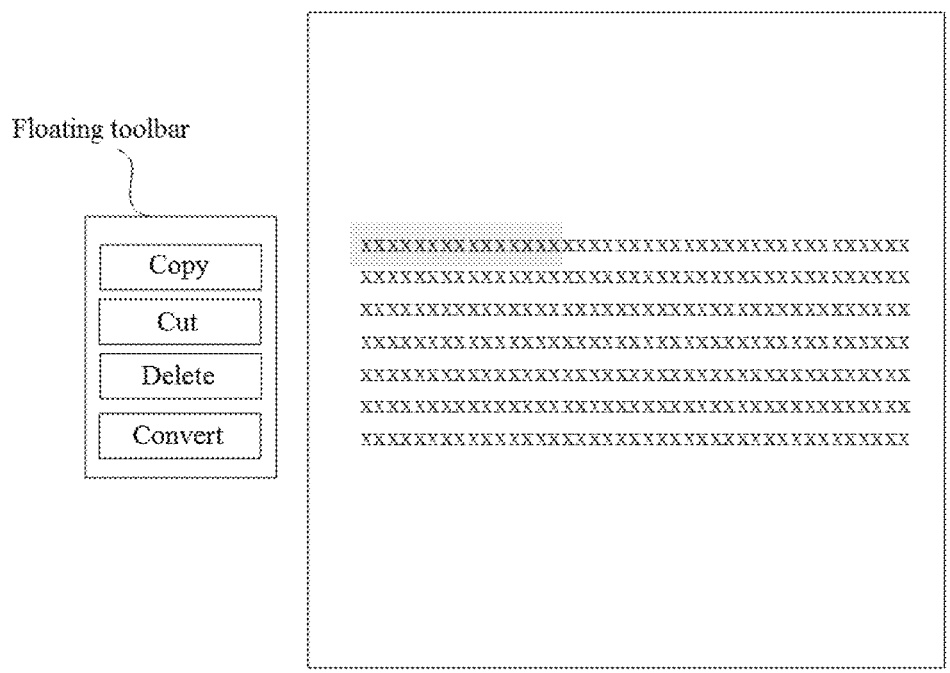

4. As shown in FIG. 2D, a new document may be created by module conversion. For example, the user may select a part of the content in the current document and click the "Convert" button in the floating toolbar to convert the selected part into a content block of document-type.

In this embodiment, establishing a reference relationship between the current document and the reference object may include: establishing a map based on the reference relationship between the current document and the reference object, where the reference relationship between the current document and reference objects is displayed in the map.

In a possible implementation, the reference relationship between the current document and the reference object may be displayed visually by using a map.

In this embodiment, after the reference relationship between the current document and the reference object is established, jumping to a new document may be performed in response to a triggering operation on the content block.

Specifically, after the reference relationship is established, the user may operate on the referenced content block. As an example, the user may click on the referenced content block. In response to the operation on the content block from the user, jumping from the current document to the new document may be performed and the content block may be displayed in the new document.

In a possible implementation, the scheme for establishing the reference relationship between the current document and the reference object may further include: establishing a first reference relationship between the current document and the content block, and establishing a second reference relationship between the current document and the new document.

Specifically, the reference object of the current document may be a content block or a document. Correspondingly, the current document may respectively establish a reference relationship with the content block and the document.

In a possible implementation, the reference relationship with the content block and the reference relationship with the new document are shown in the current document differently. The content block and the new document have different reference styles or formats. The reference relationship with the content block is directly presented in the content block, while the reference relationship with the new document is presented in an area associated with the content block.

In the embodiment of the present disclosure, firstly, in the editing interface of the current document, the operation panel is called based on the triggering event and is displayed; then the creation control for creating a reference object is displayed on the operation panel; finally, a new reference object is created in response to the operation on the creation control from the user, and a reference relationship between the current document and the reference object is established. With the method for document creation provided by the embodiment of the present disclosure, a new reference object is created in the document rapidly and an interaction relationship between the current document and the newly created reference object is automatically established, which can save the operation paths when creating a new object and improve user experience.

Figure 3:
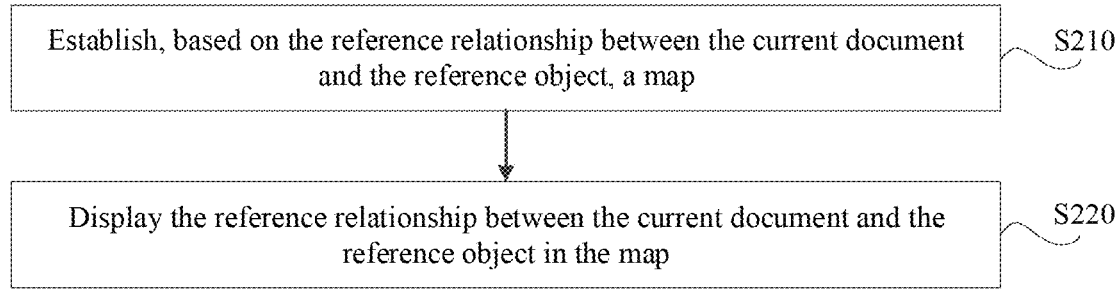
FIG. 3 is a flowchart of a method for establishing a reference relationship between a current document and a reference object according to an embodiment of the present disclosure.

FIG. 3 is a flowchart of a method for establishing a reference relationship between a current document and a reference object according to an embodiment of the present disclosure. This embodiment is applicable to the case where a reference relationship map is established in a document. As shown in FIG. 3, the method specifically includes the following steps S210-S220.

In S210, based on the reference relationship between the current document and the reference object, a map is established.

The map may be a graph used in the document to display the structural relationship between the current document and reference object.

Specifically, objects with reference relationships in the graph may be connected by lines, so that users can intuitively acquire the reference relationships in the current document.

Figure 4:
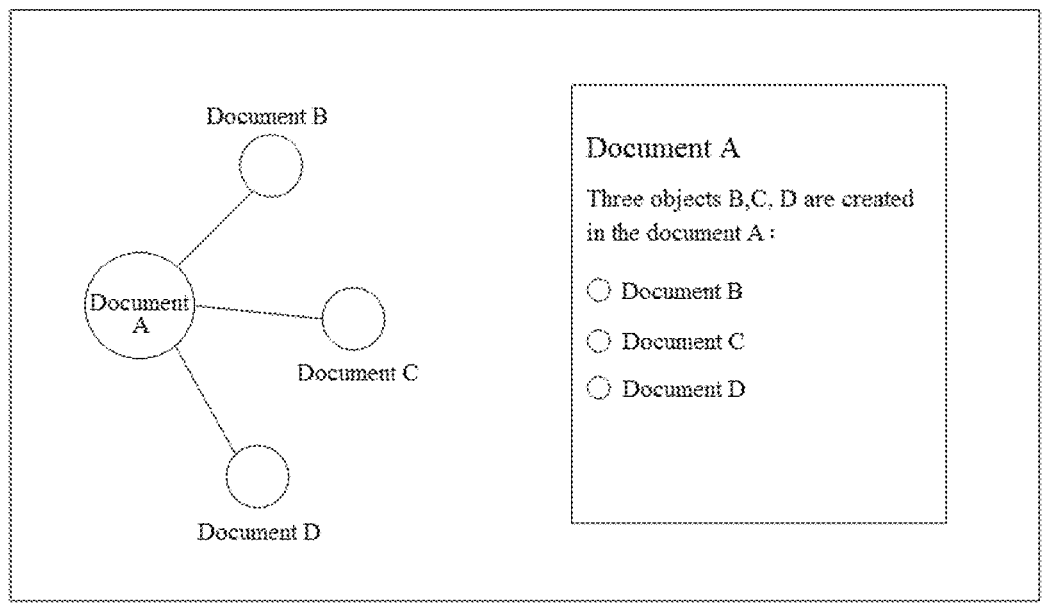
FIG. 4 is a schematic diagram of a display mode of reference relationships in a map according to an embodiment of the present disclosure.

FIG. 4 is a schematic diagram of a display mode of reference relationships in a map according to an embodiment of the present disclosure. As shown in FIG. 4, since three reference objects B, C, and D are created in document A, objects B, C, and D in the map are all connected to document A.

In S220, the reference relationship between the current document and the reference object is displayed in the map.

Specifically, the reference relationship between the current document and the reference object may be displayed in the map by using connecting lines. And, the reference objects connected to each other may also be displayed in the map by lines or set symbols.

In a possible implementation, the scheme for displaying the reference relationship between the current document and the reference object in the map may include: displaying the reference relationship independently of the map; where the reference relationship includes the reference relationship between the current document and the reference object and a reference relationship between the reference object and other reference objects.

Specifically, the reference relationship may be displayed independently of the map. For example, a floating window may be created next to the map to display all objects referenced in the current document in the form of list items.

In a possible implementation, the scheme for displaying the reference relationship between the current document and the reference object in the map may include: displaying, in response to an operation instruction inputted by the user for previewing the current document, the reference relationship between the current document and the reference object; and displaying, in response to an operation instruction inputted by the user for previewing the reference object, a reference relationship between the reference object and other reference objects.

Figure 5:
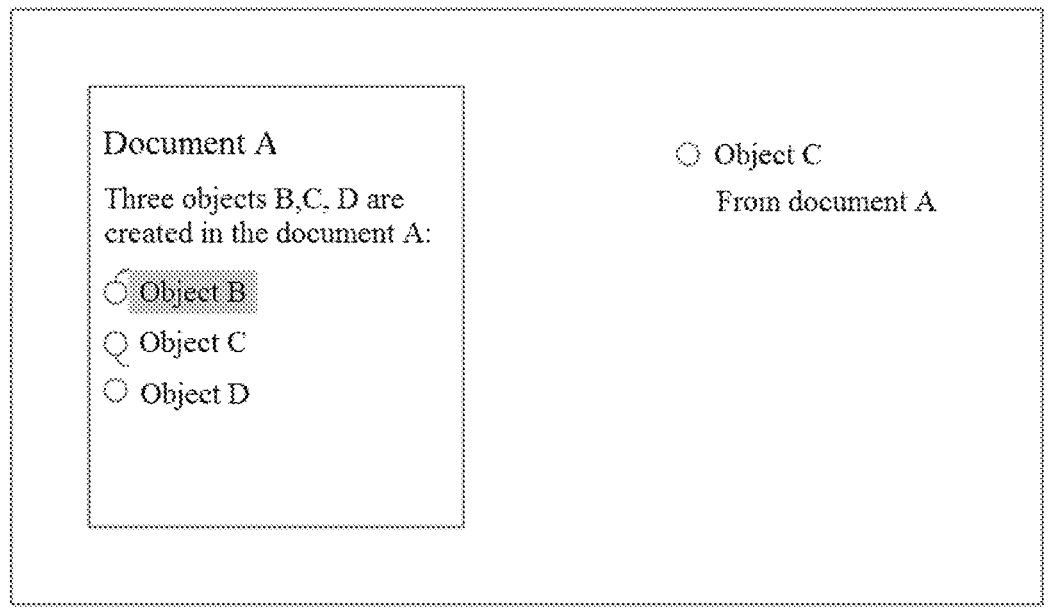
FIG. 5 is a schematic diagram of a display mode of an interactive relationship between reference objects according to an embodiment of the present disclosure.

FIG. 5 is a schematic diagram of a display mode of an interactive relationship between reference objects according to an embodiment of the present disclosure. As shown in FIG. 5, in a case that multiple reference objects are created in the current document, interactive relationships may be established between the reference objects. For example, assuming that three reference objects B, C, and D are created in document A, once clicking on document A in the map, the reference relationships between document A and reference objects B, C, and D may be displayed independently of the map; and in a case that there is a connection relationship between the reference object B and reference object C, there are lines prompt on reference objects B and C, and once clicking on document B in the map, the connection between B and C may be displayed independently of the map.

In the embodiment of the present disclosure, a map is first established based on the reference relationship between the current document and the reference object, and then the reference relationship between the current document and the reference object is displayed in the map. With the method for establishing the reference relationship provided by the embodiments of the present disclosure, it can intuitively display the reference relationship to the user in the form of a map, enabling the user to acquire the reference relationship existing in the current document more clearly, and improving user experience.

Figure 6:
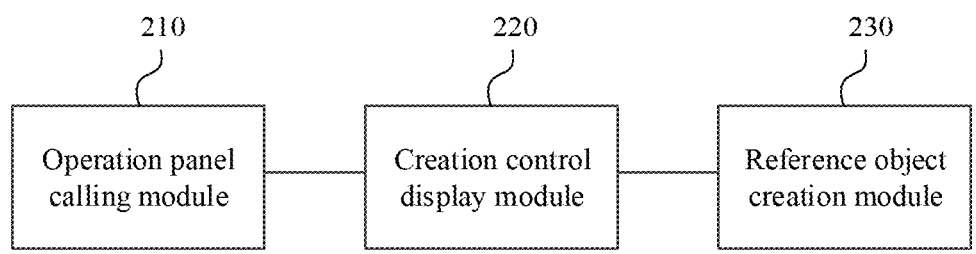
FIG. 6 is a schematic structural diagram of an apparatus for document creation according to an embodiment of the present disclosure.

FIG. 6 is a schematic structural diagram of an apparatus for document creation according to an embodiment of the present disclosure. As shown in FIG. 6, the apparatus for document creation includes: an operation panel calling module 210, a creation control display module 220, and a reference object creation module 230.

The operation panel calling module 210 is configured to call an operation panel based on a triggering event and display the operation panel, in an editing interface of a current document.

The creation control display module 220 is configured to display, on the operation panel, a creation control for creating a reference object.

The reference object is a content block, and the content block is a unit for carrying document content; or the reference object is a document.

The reference object creation module 230 is configured to create a new reference object, in response to an operation performed by a user on the creation control; and establish a reference relationship between the current document and the reference object.

In a possible implementation, the reference object creation module 230 is further configured to: establish a relationship for referencing a content block in the current document, in a case that the reference object is the content block; establish a relationship for referencing a created document in the current document, in a case that the reference object is a document.

In a possible implementation, the reference object creation module 230 is further configured to create a new document; and create a content block corresponding to the reference object in the new document.

In a possible implementation, the reference object creation module 230 is further configured to create a new document.

In a possible implementation, the reference object creation module 230 is further configured to acquire document content information corresponding to the triggering event in the current document; and use the document content information as a title or document content of the new document.

In a possible implementation, the reference object creation module 230 is further configured to establish a first reference relationship between the current document and the content block, and establish a second reference relationship between the current document and the new document.

In a possible implementation, the reference object creation module 230 is further configured to establish a map based on the reference relationship between the current document and the reference object; and display the reference relationship between the current document and the reference object in the map.

In a possible implementation, the reference object creation module 230 is further configured to display the reference relationship independently of the map; where, the reference relationship includes the reference relationship between the current document and the reference object and a reference relationship between the reference object and other reference objects.

In a possible implementation, the reference object creation module 230 is further configured to display the reference relationship between the current document and the reference object, in response to an operation instruction inputted by the user for previewing the current document; and display a reference relationship between the reference object and other reference objects, in response to an operation instruction inputted by the user for previewing the reference object.

In a possible implementation, the apparatus further includes a document content information replacement module, configured to replace the document content information corresponding to the triggering event with information of the new document in the current document, where the information of the new document includes content information and/or document identification information of the new document.

In a possible implementation, the apparatus further includes a new document creation module, configured to create a new document, and add the content block to the new document.

In a possible implementation, the apparatus further includes a triggering operation response module, configured to jump to the new document and display the content block in response to a triggering operation on the content block.

In a possible implementation, the apparatus further includes a triggering event determination module, configured to determine a triggering event for evoking is generated, in a case that a set evoking character inputted by the user is received in the editing interface of the current document.

The above apparatus for document creation can implement the methods provided by the foregoing embodiments of the present disclosure, which has corresponding functional modules and beneficial effects of implementing the above methods. For technical details not described in detail in this embodiment, reference may be made to the methods provided in the foregoing embodiments of the present disclosure.

Figure 7:
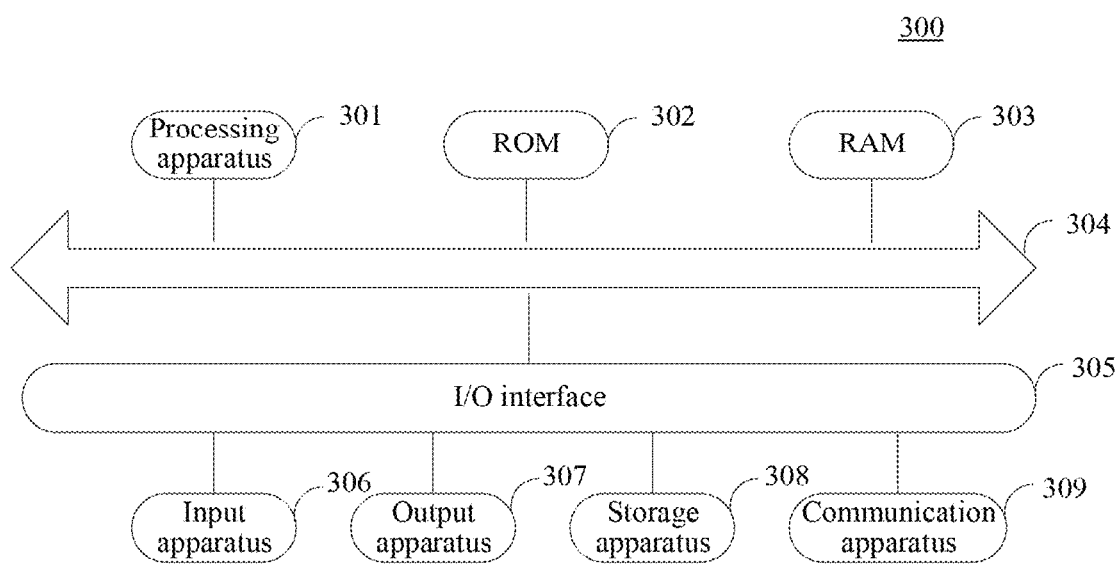
FIG. 7 is a schematic structural diagram of an electronic device according to an embodiment of the present disclosure.

Referring to FIG. 7 hereinafter, FIG. 7 illustrates a schematic structural diagram of an electronic device 300 suitable for implementing an embodiment of the present disclosure. The electronic device 300 in the embodiment of the present disclosure may include, but is not limited to, mobile terminals, such as mobile phones, laptops, digital broadcast receivers, personal digital assistants (PDAs), tablet computers (PADs), portable multimedia players (PMPs), vehicle-mounted terminals (such as in-vehicle navigation terminals), and the like, and stationary terminals such as digital TVs, desktop computers and the like, or servers in any forms such as independent servers or server clusters. It should be noted that the electronic device shown in FIG. 7 is only an example, and should not impose any limitations on the functions and scope of use of the embodiments of the present disclosure.

As shown in FIG. 7, the electronic device 300 may include a processing apparatus (such as a central processor and a graphic processor) 301. The processing apparatus may perform various appropriate actions and processing based on programs stored in a read-only memory (ROM) 302 or programs uploaded from a storage apparatus 305 to a random access memory (RAM) 303. Various programs and data required for operations of the electronic device 300 are also stored in the RAM 303. The processing apparatus 301, the ROM 302 and the RAM 303 are connected to each other through the bus 304. An input/output (I/O) interface 305 is also connected to the bus 304.

Generally, the following apparatuses may be connected to the I/O interface 305: an input apparatus 306 such as a touch screen, a touch panel, a keyboard, a mouse, a camera, a microphone, an accelerometer, and gyroscope; an output apparatus 307 such as a liquid crystal display (LCD), a loudspeaker and a vibrator; a storage apparatus 308 such as a magnetic tape and a hard disk; and a communication apparatus 309. The communication apparatus 309 may allow the electronic device 300 to communicate with other device in a wired or wireless manner to exchange data. Although FIG. 7 illustrates the electronic device 300 provided with various apparatuses, it should be understood that not all shown apparatuses are required to be implemented or included. Alternatively, more or less apparatuses may be implemented or included.

Particularly, according to the embodiments of the present disclosure, the process described above in conjunction with flowcharts may be implemented as a computer software program. For example, a computer program product is further provided according to an embodiment of the present disclosure, including a computer program carried on a computer readable medium. The computer program includes the program code for implementing the method for document creation. In the embodiment, the computer program may be downloaded and installed from the network via the communication apparatus 309, or installed from the storage apparatus 308, or installed from the ROM 302. When the computer program is executed by the processing apparatus 301, the functions defined in the method for document creation according to the embodiment of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The more specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

In some embodiments, the client and the server may perform communication by using any currently known network protocol such as Hyper Text Transfer Protocol (HTTP) or any network protocol to be developed in the further, and may connect with digital data communication (for example, a communication network) in any form or carried in any medium. Examples of the communication network include a local area network (LAN), a wide area network (WAN), Internet, and an end-to-end network (such as, ad hoc end-to-end network), and any currently known or future developed network.

The computer readable storage medium may be included in the above electronic device, or may stand alone without being assembled into the electronic device.

The computer readable medium carries one or more programs. The one or more programs, when executed by the electronic device, enable the electronic device to perform the following operations: in an editing interface of a current document, calling an operation panel based on a triggering event and displaying the operation panel; displaying, on the operation panel, a creation control for creating a reference object; creating, in response to an operation performed by a user on the creation control, a new reference object; and establishing a reference relationship between the current document and the reference object.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architecture, function and operation which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic components may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

According to one or more embodiments of the embodiments of the present disclosure, a method for document creation is provided according to the present disclosure, the method includes as follows:

in an editing interface of a current document, calling an operation panel based on a triggering event and displaying the operation panel;

displaying, on the operation panel, a creation control for creating a reference object;

creating, in response to an operation performed by a user on the creation control, a new reference object; and establishing a reference relationship between the current document and the reference object.

In a possible implementation, the reference object is a content block, and the content block is a unit for carrying document content; or the reference object is a document.

In a possible implementation, in response to the reference object being the content block, the creating the new reference object includes: creating a new document; and creating, in the new document, the content block corresponding to the reference object.

In a possible implementation, in response to the reference object being the content block, after creating the new reference object, the method further includes: creating a new document, and adding the content block to the new document.

In a possible implementation, in response to the reference object being the document; the creating the new reference object includes: creating a new document.

In a possible implementation, the creating a new document includes:
acquiring, in the current document, document content information corresponding to the triggering event; and
using the document content information as a title or document content of the new document.

In a possible implementation, after creating the new document, the method further includes: replacing, in the current document, the document content information corresponding to the triggering event with information of the new document, where the information of the new document includes content information and/or document identification information of the new document.

In a possible implementation, after establishing the reference relationship between the current document and the reference object, the method further includes:
jumping, in response to a triggering operation on the content block, to the new document.

In a possible implementation, the establishing a reference relationship between the current document and the reference object further includes:
establishing a first reference relationship between the current document and the content block, and establishing a second reference relationship between the current document and the new document.

In a possible implementation, the establishing a reference relationship between the current document and the reference object further includes:
establishing a map, based on the reference relationship between the current document and the reference object; and
displaying the reference relationship between the current document and the reference object in the map.

In a possible implementation, the displaying the reference relationship between the current document and the reference object in the map includes:
displaying, in the map, the content block referenced in the current document in a form of list.

In a possible implementation, the displaying the reference relationship between the current document and the reference object in the map includes:
displaying the reference relationship independently of the map; where the reference relationship includes the reference relationship between the current document and the reference object and a reference relationship between the reference object and other reference objects.

In a possible implementation, the displaying the reference relationship between the current document and the reference object in the map further includes:
displaying, in response to an operation instruction inputted by the user for previewing the current document, the reference relationship between the current document and the reference object; and
displaying, in response to an operation instruction inputted by the user for previewing the reference object, a reference relationship between the reference object and other reference objects.

It should be noted that the above description merely illustrates the preferred embodiments of the present disclosure and the technical principles employed. Those skilled in the art should understand that the scope of present disclosure is not limited to the specific embodiments described herein above. Various obvious changes, rearrangements and replacements may be made by those skilled in the art without departing from the scope of the present disclosure. Hence, although the present disclosure has been described in detail through the above embodiments, the present disclosure is not limited to the above embodiments, which can also include more other equivalent embodiments without departing from the concept of the present disclosure. The protection scope of the present disclosure is determined by the scope of the appended claims.

The invention claimed is:

1. A method for document creation applied in an electronic device with a processor and a display, comprising:
in an editing interface of a current document displayed on the display, calling, by the processor, an operation panel in response to detecting that a user types a set character and a text string following the set character in the current document, and displaying the operation panel on the display;
generating by the processor, on the operation panel, a creation control prompting to create a new document having the text string typed in the current document by the user as a title of the new document;
creating the new document by the processor, in response to an operation performed by the user on the creation control, wherein the title of the new document is the text string typed in the current document by the user;
taking the new document or a content block in the new document as a new reference object; and
establishing, by the processor, a reference relationship between the current document and the reference object, wherein the reference relationship comprises a synchronization relationship between the current document and the reference object.

2. The method for document creation according to claim 1, wherein the reference object is a content block, and the content block is a unit for carrying document content; or the reference object is a document.

3. The method for document creation according to claim 1, wherein after creating the new document, the method further comprises:
replacing, in the current document, the set character and the text string typed by the user with information of the new document, wherein the information of the new document comprises content information and/or document identification information of the new document.

4. The method for document creation according to claim 1, wherein after establishing the reference relationship between the current document and the reference object, the method further comprises:

jumping, in response to a triggering operation on the content block, to the new document.

5. The method for document creation according to claim 1, wherein the establishing the reference relationship between the current document and the reference object comprises:
    establishing a first reference relationship between the current document and the content block, and establishing a second reference relationship between the current document and the new document.

6. The method for document creation according to claim 1, wherein the establishing the reference relationship between the current document and the reference object comprises:
    establishing a map, based on the reference relationship between the current document and the reference object; and
    displaying the reference relationship between the current document and the reference object in the map, wherein the map comprises a line connection indicating the reference relationship between the current document and the reference object.

7. The method for document creation according to claim 6, wherein the displaying the reference relationship between the current document and the reference object in the map comprises:
    displaying, in the map, the content block referenced in the current document in a form of list.

8. The method for document creation according to claim 6, wherein the displaying the reference relationship between the current document and the reference object in the map comprises:
    displaying the reference relationship independently of the map, wherein the reference relationship comprises the reference relationship between the current document and the reference object and a reference relationship between the reference object and other reference objects.

9. The method for document creation according to claim 6, wherein the displaying the reference relationship between the current document and the reference object in the map comprises:
    displaying, in response to an operation instruction inputted by the user for previewing the current document, the reference relationship between the current document and the reference object; and
    displaying, in response to an operation instruction inputted by the user for previewing the reference object, a reference relationship between the reference object and other reference objects.

10. An electronic device, comprising:
    a display;
    one or more processors; and
    a storage, configured to store one or more instructions;
    wherein, the one or more instructions, when executed by the one or more processors, cause the one or more processors to implement:
        in an editing interface of a current document displayed on the display, calling an operation panel in response to detecting that a user types a set character and a text string following the set character in the current document, and displaying the operation panel on the display;
        generating, on the operation panel, a creation control prompting to create a new document having the text string typed in the current document by the user as a title of the new document;
        creating the new document, in response to an operation performed by the user on the creation control, wherein the title of the new document is the text string typed in the current document by the user;
        taking the new document or a content block in the new document as a new reference object; and
        establishing a reference relationship between the current document and the reference object, wherein the reference relationship comprises a synchronization relationship between the current document and the reference object.

11. The electronic device according to claim 10, wherein the one or more processors are further caused to implement:
    replacing, in the current document, the set character and the text string typed by the user with information of the new document, wherein the information of the new document comprises content information and/or document identification information of the new document.

12. A non-transitory computer readable storage medium storing a computer program thereon, wherein the computer program, when executed by a processor of an electronic device with a display, implements:
    in an editing interface of a current document displayed on the display, calling an operation panel in response to detecting that a user types a set character input and a text string following the set character in the current document, and displaying the operation panel on the display;
    generating, on the operation panel, a creation control prompting to create a new document having the text string typed in the current document by the user as a title of the new document;
    creating the new document, in response to an operation performed by a user on the creation control, wherein the title of the new document is the text string typed in the current document by the user;
    taking the new document or a content block in the new document as a new reference object; and
    establishing a reference relationship between the current document and the reference object,
        wherein the reference relationship comprises a synchronization relationship between the current document and the reference object.

* * * * *